United States Patent [19]

Akazawa et al.

[11] 4,121,943

[45] Oct. 24, 1978

[54] METHOD FOR MIXING STEEL FIBER IN CONCRETE OR MORTAR

[75] Inventors: Haluichi Akazawa, c/o Isaku Nishi, 5, Higashifukonokawa-cho; Kiyoshi Okada, 22-5, Yoshidakonoe-cho, both of Sakyo-ku, Kyoto-shi, Japan

[73] Assignees: Haluichi Akazawa; Kiyoshi Okada; Yoshiro Mizoguchi, all of Japan

[21] Appl. No.: 814,546

[22] Filed: Jul. 11, 1977

[30] Foreign Application Priority Data

Jul. 24, 1976 [JP] Japan .................................. 51-088466

[51] Int. Cl.² ................................................ C04B 7/02
[52] U.S. Cl. ..................................................... 106/99
[58] Field of Search ........................................ 106/99

[56] References Cited

U.S. PATENT DOCUMENTS

| | | | |
|---|---|---|---|
| 3,429,094 | 2/1969 | Romualdi | 106/99 |
| 3,716,386 | 2/1973 | Kempster | 106/99 |
| 3,758,319 | 9/1973 | Ergene | 106/99 |
| 3,834,916 | 9/1974 | Kesler | 106/99 |

*Primary Examiner*—James Poer
*Attorney, Agent, or Firm*—Weingarten, Maxham & Schurgin

[57] ABSTRACT

A method for mixing steel fiber in concrete or mortar, while disentangling a mass of steel fiber and spreading the same is provided. The method comprises in combination the steps of rotating a disc having radial bosses on the surface thereof, feeding a mass of steel fiber to the central part of the boss side of the said rotating disc and spreading the said mass of steel fiber in pieces in the radial direction with the aid of centrifugal force caused by the said disc simultaneously upon disentangling the said mass of steel fiber by catching the same by the aforesaid bosses, wherein the concrete or mortar in an unset state is arranged within the scope of the spread steel fiber.

2 Claims, 10 Drawing Figures

METHOD FOR MIXING STEEL FIBER IN CONCRETE OR MORTAR

BACKGROUND OF THE INVENTION

The present invention relates to a method for mixing steel fiber in concrete or mortar.

Recently, methods of improving the tensile strength, crack resistance, toughness, etc. of concrete or mortar by mixing steel fiber with the diameter of about 0.2–0.5 m/m and length of about 30–50 m/m in the concrete or mortar for public works and construction have been studied in various countries with much success. On the other hand, a method of manufacturing the abovementioned steel fiber with efficiency and in large quantities is being developed. Accordingly, it is apparent that concrete or mortar which is reinforced by steel fiber will be industrially used on an extensive scale in the near future. There, however, is a problem at present as to the method of mixing the abovementioned steel fiber in concrete or mortar. Namely, it is necessary that the aforesaid steel fiber is spread evenly in concrete or mortar, the direction of the fiber being arranged at random, while the abovementioned steel fiber is evenly spread in concrete or mortar in order that the concrete or mortar mixed with steel fiber may fully perform its function. And it is necessary to mix steel fiber in considerably great quantities in concrete or mortar in a short period of time in order that it is utilized industrially (e.g., it is said to be necessary to mix around 100 kg of steel fiber for concrete of 1 $m^3$ and that it is necessary to dispose about 100 kg. of steel fiber in about three minutes in the case of compounding the abovementioned concrete at one step). Conventionally, however, only inefficient methods such as spreading fiber on concrete or mortar after disentangling it by hand or spreading steel fiber on concrete or mortar after sieving the short fiber which was disentangled by a rake or a rotating claw have been devised and an efficient method thereof is being groped in each country of the world under the present state.

BRIEF SUMMARY OF THE INVENTION

This invention has been made in the light of such a state and this invention can mix steel fiber evenly and in random alignment in concrete or mortar as a matter of course, and furthermore it provides a method of mixing steel fiber in concrete or mortar, wherein it is possible to dispose a great quantity of steel fiber within a considerably short period of time with its very simple construction.

BRIEF DESCRIPTION OF THE ACCOMPANYING DRAWINGS

The present invention will be further illustrated by way of example with reference to the accompanying drawings, in which.

DETAILED DESCRIPTION OF THE PREFERRED EMBODIMENT

Four embodiments of the method of the present invention and three practicing examples thereof will be described hereunder with reference to the accompanying drawings.

First of all, a disc having radial bosses on the surface is rotated by the motor, a mass of steel fiber is fed by prescribed amount to the central part of the surface on the boss side of this rotating disc, the mass of steel fiber is disentangled by catching it by the abovementioned bosses and at the same time it is spread in the radial direction of the abovementioned disc by the centrifugal force.

The abovementioned method will be described in further details here together with its device.

Figure 1:
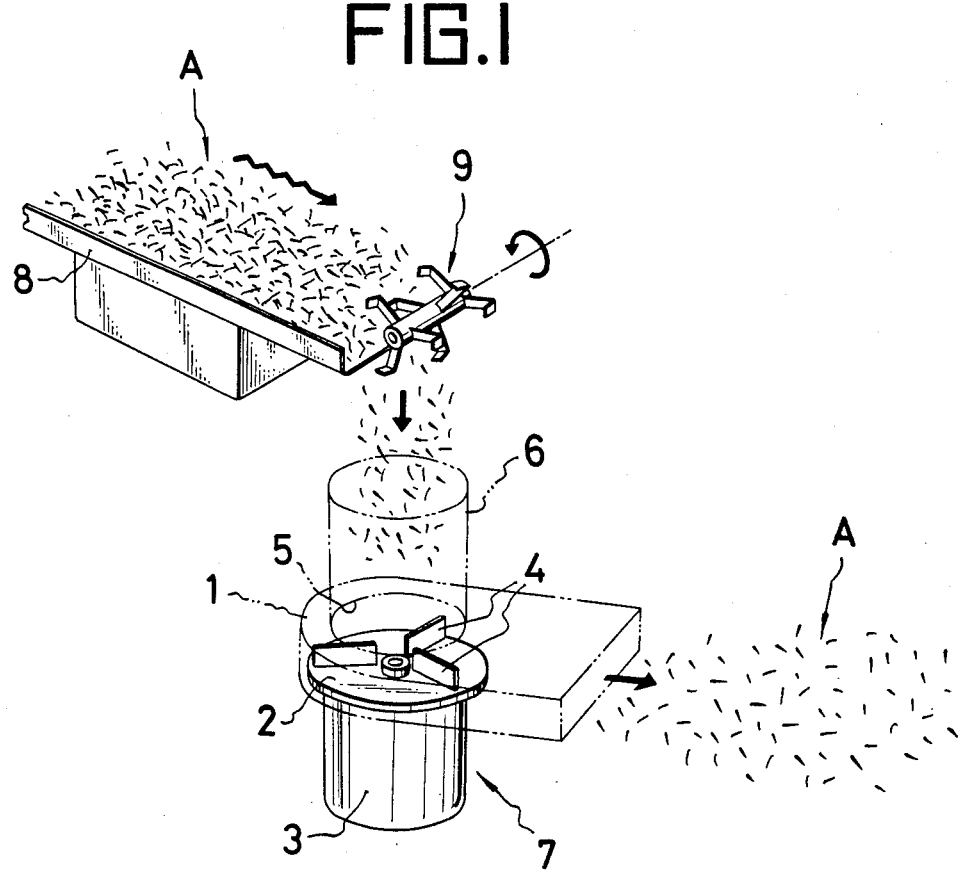
FIG. 1 is a perspective view of a first embodiment of the method according to the present invention.

First Embodiment (FIG. 1)

The disc 2 is arranged in the cylindrical housing 1 a part of the side wall of which is partially opened in the prescribed direction in a nozzle shape so that this disc 2 may be rotated at high speed by means of the motor which is fixed to the abovementioned housing base 1. Moreover, a plurality of plate-shaped bosses 4 are radially fixed on the surface of the said disc 2. Whereas opening the aperture 5 which opens the said housing 1 outwardly at the position facing the central part of the abovementioned disc 2 of the ceiling plate of the aforesaid housing 1, the foundation edge opening part of the cylindrical hopper 6 is connected to this aperture 5, opening the top opening part of the hopper 6 is opened upwardly. Furthermore, a vibration feeder 8 is arranged above the upper part of the steel fiber spreader 7 thus constructed, the mass of steel fiber A is guided to the upper part of the hopper 6 and the abovementioned mass of steel fiber is split into small masses by the rotor claw 9 which rotates at the upper part of this hopper 6 so as to drop these small masses in the abovementioned hopper 6.

Such being the construction, the mass of the steel fiber A is fed to the central part of the surface of the side of the bosses of the disc 2 which rotates together with the radial boss 4 in the form of small masses. Whereas the small masses of this steel fiber A are caught and disentangled by the boss 4 sequentially from the lower one, they are spread in pieces out of the housing 1 by the centrifugal force.

Figure 2:
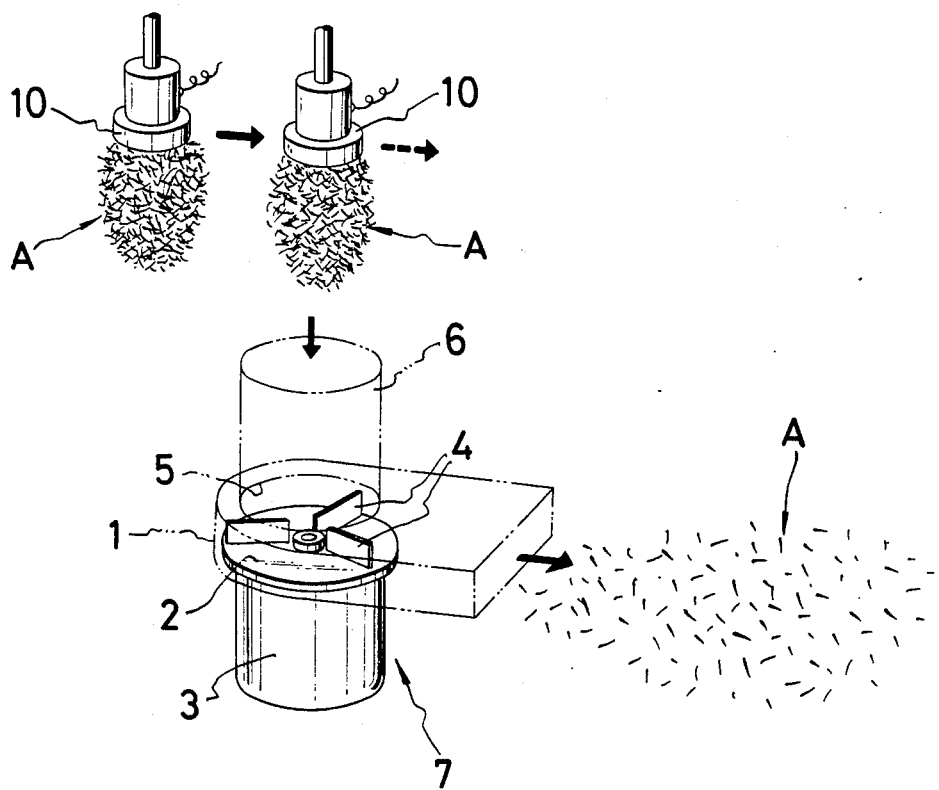
FIG. 2 is a perspective view of a second embodiment of the present invention.

Second Embodiment (FIG. 2)

The construction of the steel fiber spreader 7 is the same as in the First Embodiment.

A plurality of electromagnets 10, which is fitted to the chain conveyor (not illustrated) and moves round between the upper part of the aperture of the hopper 6 and the great hopper for reserving steel fiber not illustrated, is mounted on the upper part of this steel fiber spreader 7. This electromagnet adsorbs the mass of the predetermined amount of steel fiber A after being charged in the great hopper and is uncharged on the hopper 6 so that the said mass of steel fiber will be dropped into the hopper 6.

Such being the construction, the steel fiber A is disentangled into pieces and is spread out of the steel fiber spreader 7 exactly in the same manner as in the case of First Embodiment.

Figure 3:
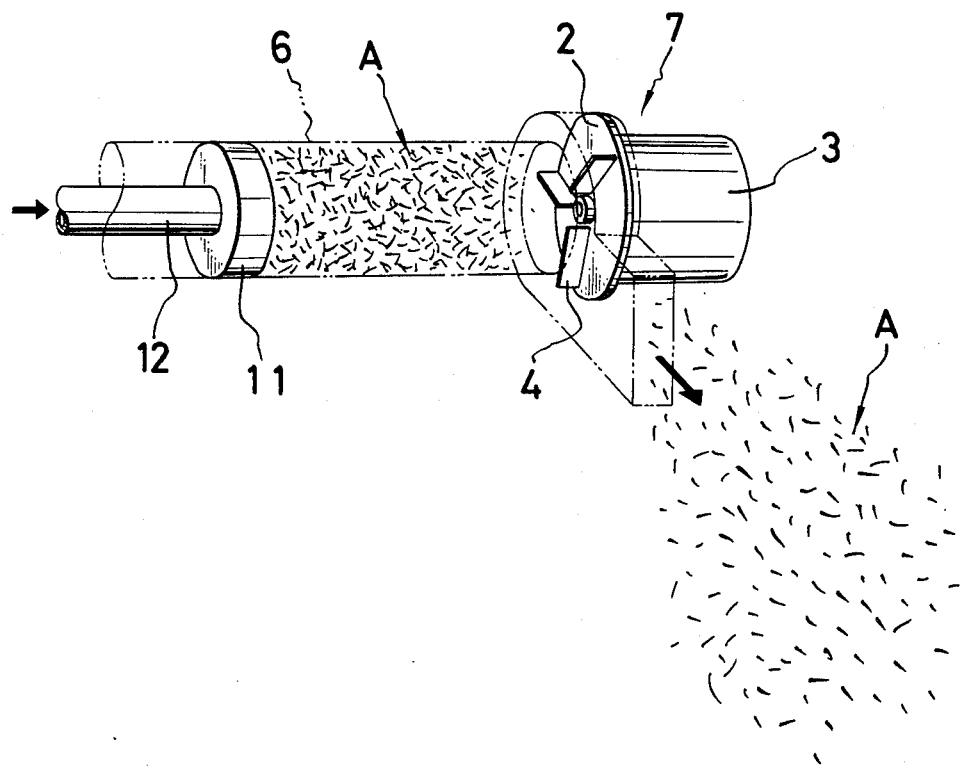
FIG. 3 is a perspective view of a third embodiment of the present invention.

Third Embodiment (FIG. 3)

Whereas the steel fiber spreader 7 with almost the same construction as in First and Second Embodiments is so mounted as the disc 2 will rotate within the vertical plane, the top of the cylindrical hopper 6 is elongated in the horizontal direction. The piston 11 is also inserted in the inside wall of this hopper 6 to be slidable toward the surface of the aforesaid disc 2 while the top end of the piston rod 12, which is horizontally reciprocated by means of a pressing device (not illustrated), is connected to the back end surface of the abovementioned piston 11. Such being the construction, the steel fiber A which is put into the hopper 6 is fed into the central part of the surface on the boss side of the disc 2 each by predetermined amount, if the piston 11 is drawn out from the hopper 6 by pushing back the piston rod 12, the piston 11 is again inserted in the hopper 6 after putting the mass of steel fiber A into the hopper and the said piston 11 is moved forward in the direction of the disc 2 at the predetermined speed by means of the aforesaid pressing device. Thereafter, it is so made that steel fiber A is sequentially caught and disentangled by the boss 4 and at the same time it is spread out of the housing 1 in pieces by the centrifugal force. In this case, it is also possible to adjust the speed of spreading steel fiber A by regulating the forward moving speed of the piston.

Figure 4:
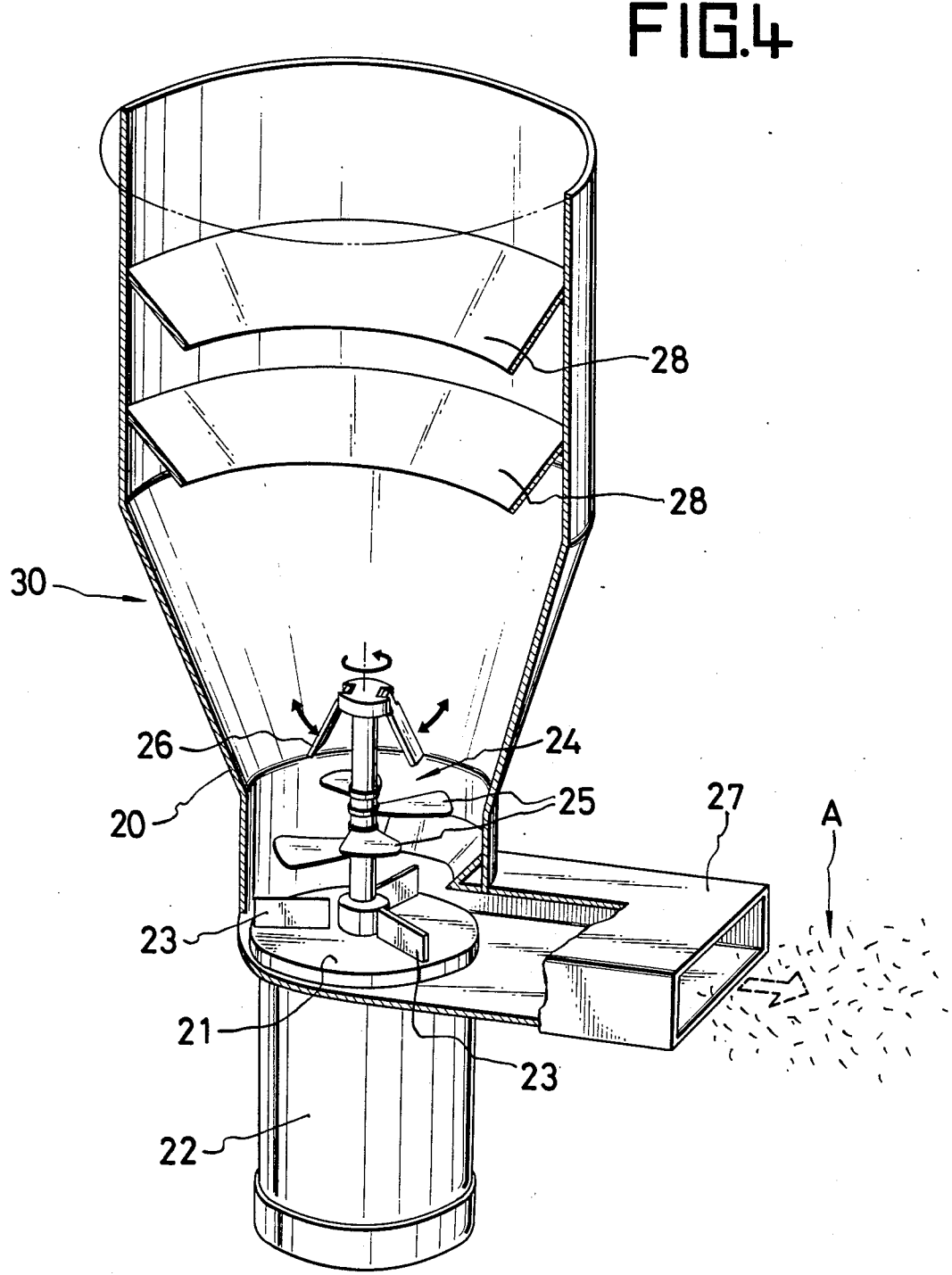
FIG. 4 is a cross sectional perspective view of a forth embodiment of the invention.

Fourth Embodiment (FIG. 4)

The cylindrical hopper 20 having a base with small diameter on the base side is mounted with its upper part opened. The disc 21 with slightly smaller diameter than the base inside diameter of the aforesaid hopper 20 is mounted on the base part of the said hopper 20, and this disc 21 is so made as to be rotated horizontally by the motor 22 which is fitted to the outside of the base wall of the hopper 20. Whereas the plate-shaped bosses 23 are radially arranged on the upper surface of the said disc 21, the central boss 24 is erected at the axis center of the upper surface of the disc 2 at the same time. Whereas the central boss 24 has a horizontal vane 25 with a plurality of blades which is alternately arranged at the central part and it has a pendulum-like agitating arms 26 at the top end at the same time. The abovementioned horizontal vane 25 is so mounted as its projecting area is 50–100% of the surface area of the aforesaid disc 21. The abovementioned agitating arms 26 are rotatably fixed to the top and flange part of the abovementioned central boss 24 at its foundation edge and the top ends of the said agitating arms 26 are made to be expanded outwardly by the centrifugal force when the central boss 24 rotates together with the disc 21. An aperture which opens the hopper 20 outwardly is opened at the position facing the abovementioned disc 21 of the side wall of the base of the aforesaid hopper 20 and the boss 23, and the square pillar pipe-shaped nozzle 27 is fitted to this aperture in the prescribed direction. A plurality of the flanges 28, hanging down toward the center of the lower part, is mounted inside the wall on the large diameter side of the abovementioned hopper 20.

As this is a spreader 30 which is constructed as mentioned above, an arch-formed mass of steel fiber as fed in the hopper is first broken by the agitating arm 26, its dropping amount is adjusted by the horizontal vane 25 and is fed on the surface of the disc 21 each by the predetermined amount when the mass of steel fiber is put into the hopper 20 and the disc 21 is rotated. While it is further disentangled into smaller pieces here by the boss 23, the steel fiber is spread into pieces outside of the hopper through nozzle 27 by centrifugal force. The abovementioned flange 28 is mounted so that the weight of the steel fiber will not directly bear on the abovementioned disc 21 or the central boss 24.

Next, the steel fiber disentangled into pieces is mixed in concrete 31 or mortar 32 by arranging the concrete 31 or mortar 32 in an unset state toward the front of the steel fiber spreading direction of the steel fiber spreader 7 (30) which is so constructed as above.

Its example is introduced hereunder.

Figure 5:
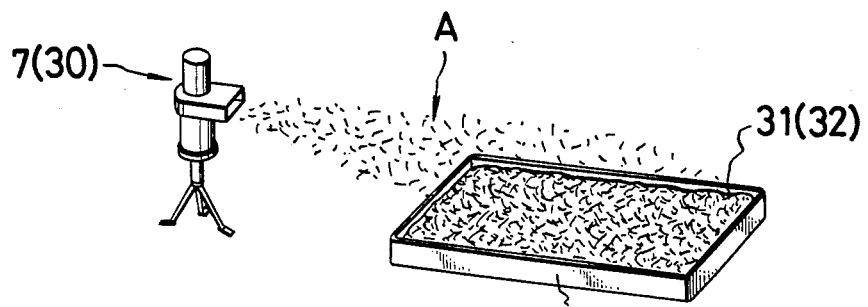
FIG. 5 is a schematical perspective view of a first practiciting example of the method according to the present invention.

Practicing Example (a) (FIG. 5)

The concrete 31 or the mortar 32 in an unset state, which is put into a flat container 33 with its upper surface opened, is arranged frontward in the steel fiber spreading direction of the spreader 7 (30), short fiber A is spread from the abovementioned spreader 7 (30) on the said concrete 31 or the mortar 32 and at the same time the abovementioned concrete 31 or mortar 32 is mixed and placed in this container 33.

Figure 6:
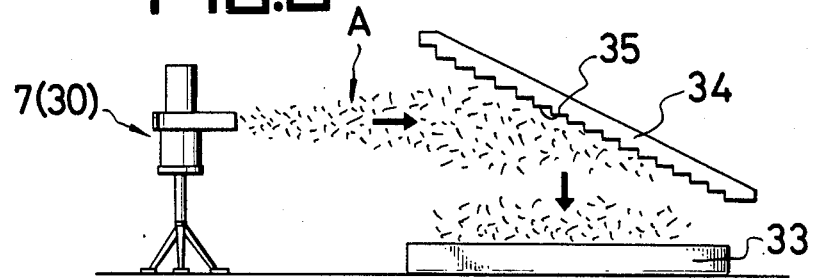
FIG. 6 is a schematical perspective view of a second practicing example of the method of the invention.

Practicing Example (b) (FIG. 6)

The arrangement of the spreader 7 (30) and the container 33 is the same as in the case of Example (a). The inclined plate 34 is also mounted slantwise on the upper side of the abovementioned container 33 by raising the aforesaid spreader side. The lower surfaces of the said inclined plate 34 is stairway shaped, having a plurality of vertical faces 35, and the steel fiber A which is horizontally spread by the spreader 7(30) collides with the vertical surface 35 of this inclined plate 33 and drops down on the concrete 31 or the mortar 32 which is arranged on the lower part of the said inclined plate 34. It is possible to mix a great quantity of steel fiber A in the concrete 31 or the mortar 32 in a short period of time and in a comparatively narrow space by so doing.

Figure 7:
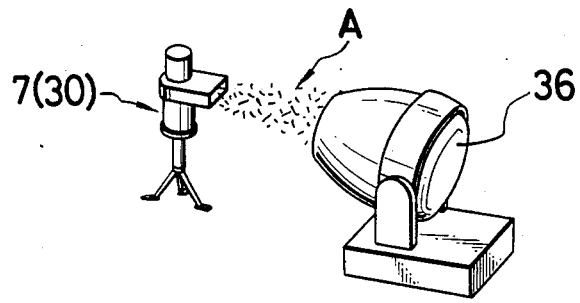
FIG. 7 is another schematical perspective view of a third practicing example of the method of the invention.

Practicing Example (c) (FIG. 7)

The spreader 7(30) is arranged near the concrete mixer 36 and steel fiber is spread forward its opening part during the operation of the concrete mixer 36.

It is possible to mix steel fiber in concrete or mortar evenly and in random alignment and to dispose a great quantity of steel fiber within a comparatively short period of time by the abovementioned method. For instance, we obtained the experimental result that it is possible to mix 20 kg of steel fiber in the concrete within one minute in case of combining Example 4 and Example (a) whereas a motor with the 2 horse-power is used. As the construction is very simple, its working is easy and it is possible to increase the disposing capacity of steel fiber merely by making the shape and the output power of the motor greater.

Figure 8A:
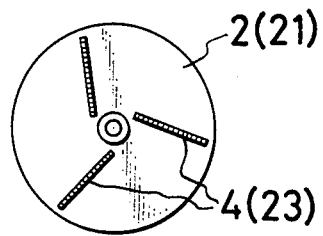
FIGS. 8(A), 8(B) and 8(C) are plan views of modified discs and bosses for disentangling the mass of steel fiber respectively.
Figure 8B:
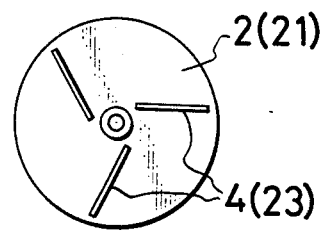
Figure 8C:
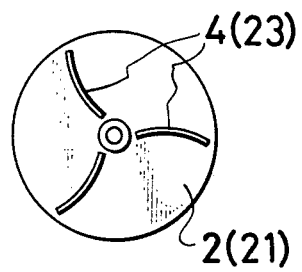

Incidentally, the disc is not always necessary to be directly connected to the rotating axis of the motor and it is a matter of course that the decelerator may be interposed therein. It is not always necessary to arrange the radial boss 4(23) exactly in the radial direction of the disc 2(21) and may be fixed, for instance, in the biased direction or position and may be mounted with a little curvature as shown in FIGS. 8(A)-8(C). Moreover, the shape of the radial boss 4 may not be a flat plate shape as mentioned above but may be, for instance, the shape of wirebrush with a plurality of steel wire erected on the upper part or may be the shape of a saw tooth with notches on the upper part. Provided, however, that it is desirable to make the height of the boss, i.e., the height from the surface of the disc to the upper end of the boss more than one half of the longitudinal length of steel fiber.

As mentioned above in details, the invention can provide a method of mixing steel fiber in concrete or mortar, which is able to dispose a great quantity of steel fiber within a comparatively short period in addition to being able to mix steel into concrete or mortar evenly and in random alignment by spreading steel fiber in concrete or mortar in an unset state by means of centrifugal force

What is claimed is:

1. A method for mixing steel fiber in concrete or mortar comprising, in combination, the following steps:
   rotating a disc having a plurality of radial bosses on one surface thereof;
   feeding a mass of steel fibers to the central part of the boss side of said rotating disc whereby the radial bosses will act to disentangle the steel fibers of said mass and the rotating action of the disc will impart centrifugal force to the steel fibers, thereby spreading them apart;
   discharging said fibers from said disc, under the influence of said centrifugal force; and
   disposing said concrete or mortar in an unset state in a position as to receive the steel fibers as they are discharged from the rotating disc.

2. The method of claim 1 wherein the step of discharging the steel fibers from the rotating disc includes directing the fibers via a nozzle having an aperture disposed in the direction of the concrete or mortar.

* * * * *